US009206785B2

(12) United States Patent
Poole

(10) Patent No.: US 9,206,785 B2
(45) Date of Patent: Dec. 8, 2015

(54) WIND TURBINE

(71) Applicant: Thomas Bertram Poole, Gause, TX (US)

(72) Inventor: Thomas Bertram Poole, Gause, TX (US)

(*) Notice: Subject to any disclaimer, the term of this patent is extended or adjusted under 35 U.S.C. 154(b) by 0 days.

(21) Appl. No.: 14/540,233

(22) Filed: Nov. 13, 2014

(65) Prior Publication Data

US 2015/0063978 A1     Mar. 5, 2015

Related U.S. Application Data

(63) Continuation of application No. 13/362,342, filed on Jan. 31, 2012, now abandoned.

(51) Int. Cl.
*F03D 3/04* (2006.01)
*F03D 7/06* (2006.01)

(52) U.S. Cl.
CPC ............... *F03D 3/04* (2013.01); *F03D 3/0445* (2013.01); *F03D 7/06* (2013.01); *F05B 2240/40* (2013.01); *F05B 2240/911* (2013.01); *F05B 2240/913* (2013.01); *Y02E 10/728* (2013.01); *Y02E 10/74* (2013.01)

(58) Field of Classification Search
CPC .......... F03D 3/0445; F03D 3/04; F03D 7/06; F05B 2240/40; F05B 2240/913; F05B 2240/911
USPC ............. 415/148, 149.1, 191, 196, 201, 202, 415/208.1, 211.1, 4.2, 4.4; 416/68, 93 R, 416/197 A
See application file for complete search history.

(56) References Cited

U.S. PATENT DOCUMENTS

| | | | |
|---|---|---|---|
| 557,681 A * | 4/1896 | Johnson | 415/4.2 |
| 561,040 A * | 5/1896 | Zwiebel | 415/4.2 |
| 6,626,642 B1 | 9/2003 | Veldkamp | |
| 2004/0042899 A1 | 3/2004 | Khan | |
| 2005/0019151 A1* | 1/2005 | Bezemer | 415/4.4 |
| 2009/0146432 A1 | 6/2009 | Ballena | |
| 2009/0220339 A1 | 9/2009 | Wu et al. | |
| 2009/0285682 A1 | 11/2009 | Baker et al. | |
| 2009/0324407 A1 | 12/2009 | Manfredotti et al. | |
| 2010/0260593 A1* | 10/2010 | Cumings et al. | 415/1 |
| 2011/0116930 A1 | 5/2011 | Ball | |
| 2011/0229304 A1 | 9/2011 | Fang | |
| 2013/0195636 A1 | 8/2013 | Poole | |

FOREIGN PATENT DOCUMENTS

WO    WO-2004/011801 A1    2/2004

OTHER PUBLICATIONS

"U.S. Appl. No. 13/362,342, Non Final Office Action mailed May 14, 2014", 16 pgs.

* cited by examiner

*Primary Examiner* — Dwayne J White
*Assistant Examiner* — Brian P Wolcott

(57) ABSTRACT

A vertical axis wind turbine system is provided that converts wind energy into electrical or mechanical energy. The turbine comprises at least one turbine rotor with a plurality of curved blades for receiving head-on wind generated airflow. Shield means mountable around at least a portion of the rotor serve to protect the upstream-moving blades from head-on wind airflow and thereby reduce drag. In one embodiment, load compensation means are provided to adjust the moment of inertia of the turbine rotor. One or more of the turbine rotor blades is hollow and defines a closed volume for holding a fluid, the fluid being displaceable in use through baffle means towards or away from the vertical axis of the rotor as the rotational velocity of the rotor changes.

19 Claims, 15 Drawing Sheets

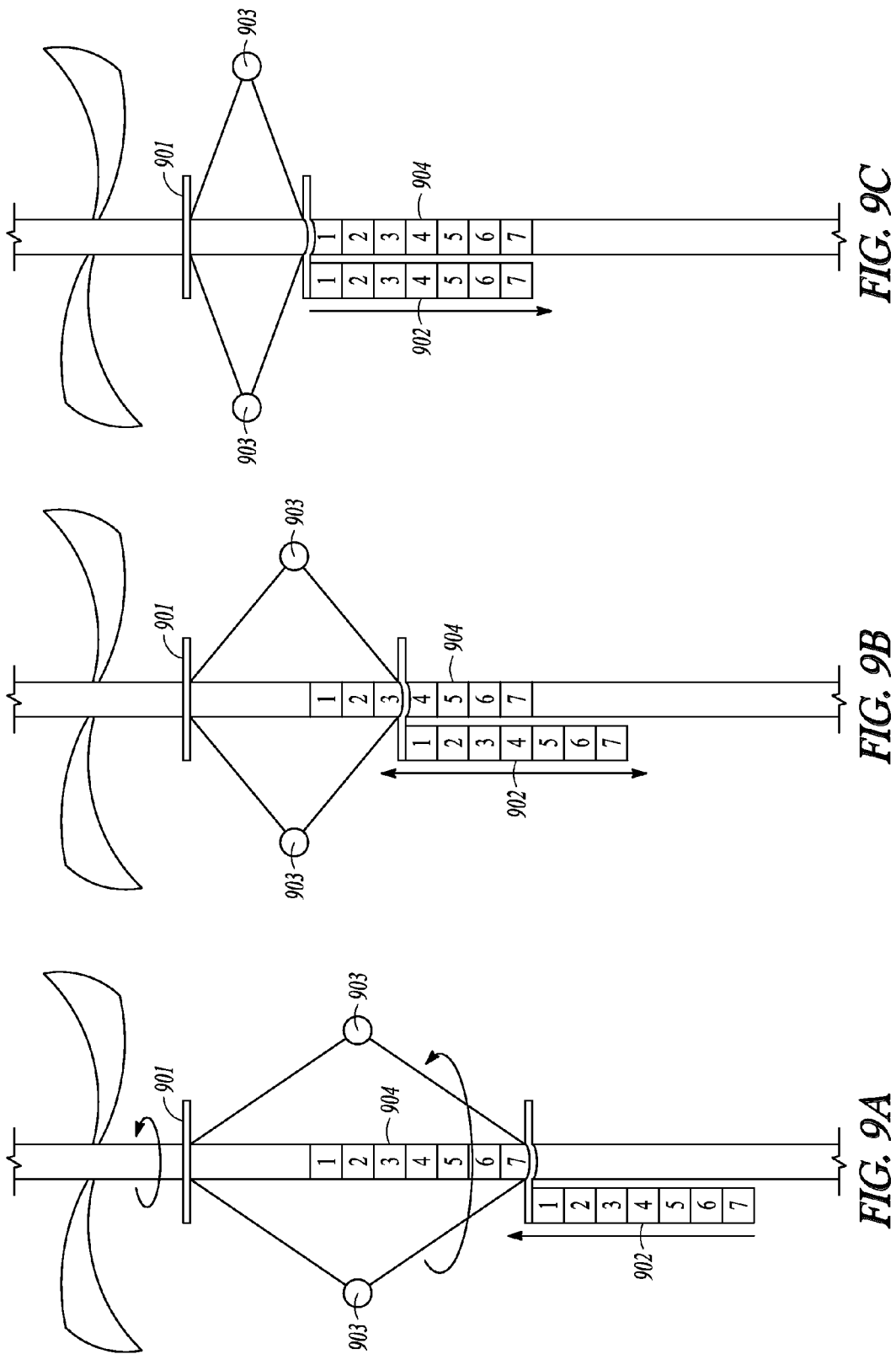

WIND TURBINE

CLAIM OF PRIORITY

This application claims the benefit of priority of U.S. patent application Ser. No. 13/362,342, entitled "WIND TURBINE," filed on Jan. 31, 2012, the benefit of priority of which is claimed hereby, and which is incorporated by reference herein in its entirety.

TECHNICAL FIELD

An example embodiment of the invention pertains generally to a vertical wind turbine system having wind shield means for reducing drag on the non-driving (return) blades of the turbine imposed by the oncoming wind. Another example embodiment relates to a wind turbine system with load compensation means.

BACKGROUND

Various wind turbines and air screws for the generation of electricity have been proposed. The present disclosure relates to a vertical axis type of air turbine, more commonly known as a "vertical" wind turbine. One difficulty with vertical rotating blades is that about half of the blades are driving the turbine at any time whereas the opposite half or "dead" blades slow the rotation down due to drag. These dead or non-driving blades are return blades trying to move upwind during part of their rotational cycle against the direction of the prevailing wind. This drag can significantly reduce the power output and energy conversion efficiency of vertical wind turbines.

Another difficulty is that the torque on a vertical turbine blade can be compromised in that at low wind speeds it may not take much load to stop the turbine from turning while at high speeds the rotational velocity of a load-uncompensated turbine can become very high causing instability and excessive vibration. Even at high speeds the angular momentum of an uncompensated turbine can be insufficient to maintain an even speed when load is applied.

BRIEF DESCRIPTION OF DRAWINGS

Some embodiments are illustrated by way of example and not limitation in the figures of the accompanying drawings in which:

FIGS. 9A-9C show sectional views of a governor system for use in a wind turbine system, according to example embodiments.

DETAILED DESCRIPTION

Figure 1A:
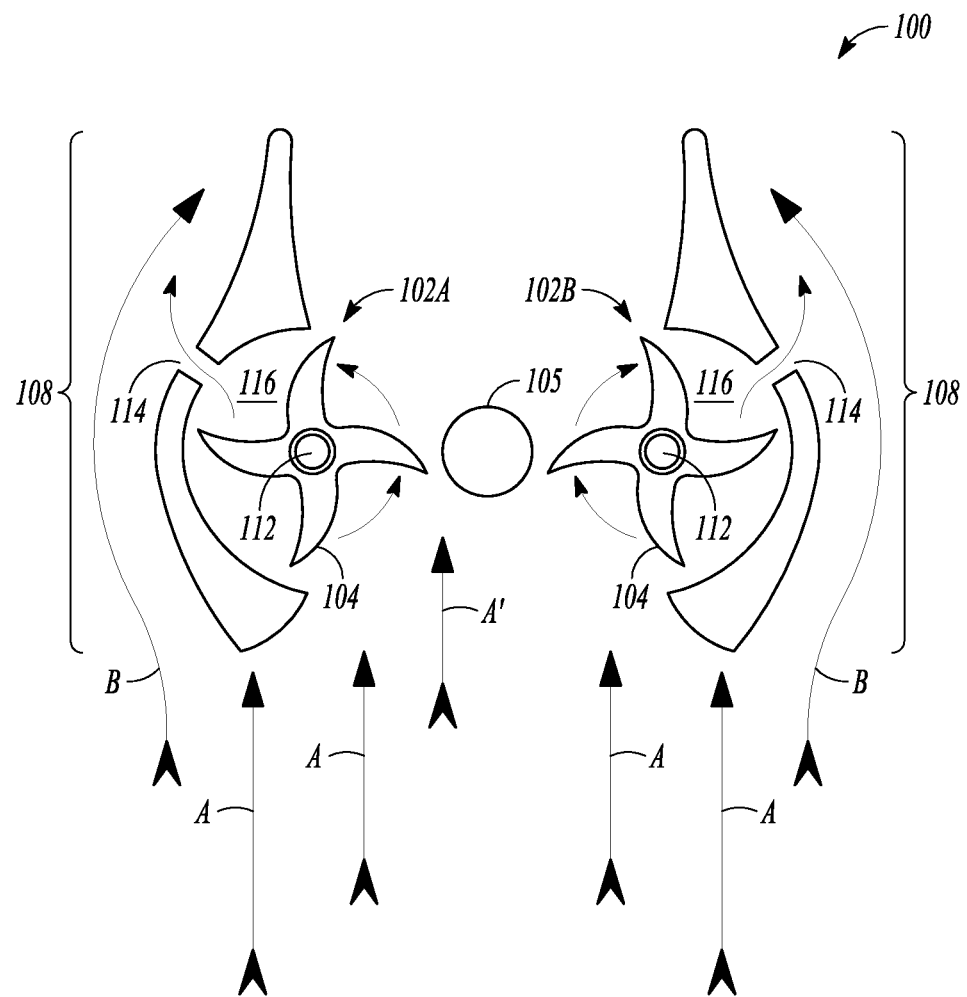
FIG. 1A shows a sectional view of a wind turbine system, according to an example embodiment.
Figures 1B, 1C:
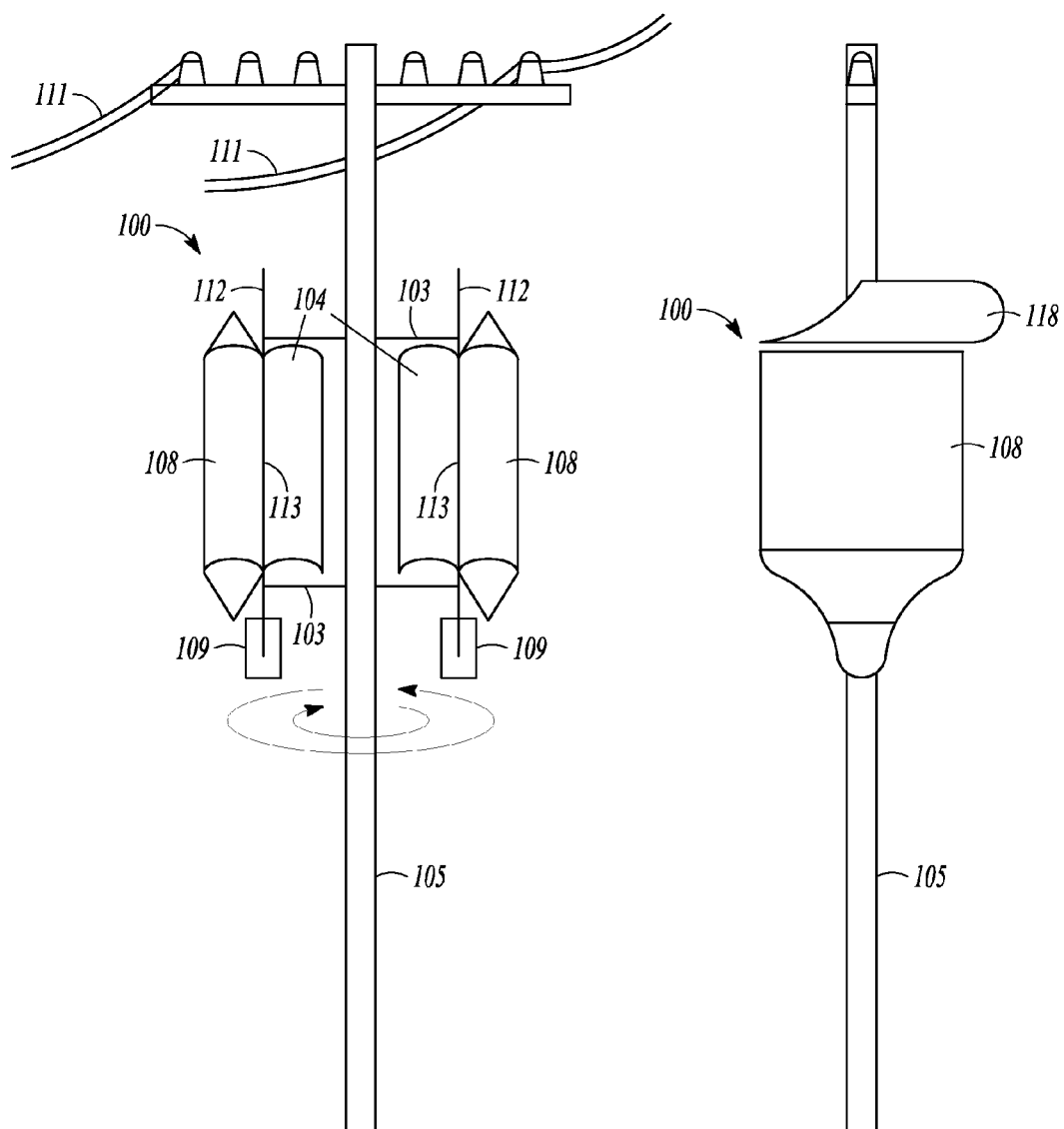
FIG. 1B shows a front side view of the wind turbine system shown in FIG. 1A.
FIG. 1C shows an end side view of the wind turbine system shown in FIG. 1A.

Reference is now made to FIGS. 1A-1C of the accompanying drawings which show a vertical axis wind turbine system 100 that converts wind energy into electrical or mechanical energy. Use of the word "vertical" in this specification is not intended to limit the application of the disclosure. Horizontally disposed wind turbine systems, or "vertical"-type turbines having an axis of rotation disposed at any inclined angle are within the scope of this disclosure.

The turbine system 100 comprises at least one turbine rotor 102A which has a plurality of curved blades 104 for receiving head-on wind generated airflow, as shown by arrows A in FIG. 1A. In the illustrated embodiment, two turbine rotors 102A and 102B are shown but the system could have three or more such rotors. In other embodiments, the blades could be straight or planar, relatively thick or thin in sectional thickness, and with or without a leading or trailing edge. Any blade or foil that works to drive a vertical-type turbine is within the scope of this application.

In the illustrated embodiment, both rotors are mounted rotatably in a rotor support structure shown generally at 103 in FIG. 1B. The support structure 103 is in this example embodiment rotatably mounted to a base or support, such as a vertically oriented utility pole 105 for example. The rotable nature of the support structure means that the rotors can be swung into an optimum wind position for maximum wind energy conversion. The rotors serve to drive electrical power generators shown generally at 109 in FIG. 1B. The generators are set up to send electrical power to a power grid, for example, along utility lines 111.

As the rotors 102A and 102B rotate under influence of the head-on wind A, at least some of the rotor blades 104 move in a downstream wind direction (i.e. up the page in FIG. 1A) and some of the blades on the opposed (return) side of the rotor move in an upstream wind direction (i.e. down the page in FIG. 1A). Thus, in the illustrated configuration of the system 100 in FIG. 1A, the rotor 102B rotates in a clockwise direction while the rotor 102A rotates the other way in a counter-clockwise direction.

It will be appreciated that the rotor blades 104 on the so-called "unproductive" or "dead" side of each rotor 102A and 102B (i.e. on the left side of rotor 102A, and right side of rotor 102B in FIG. 1A) would, if unprotected from the head-on wind, ordinarily have to move upstream against the full force of the wind airflow. In order to reduce the drag forces exerted by the wind on these unproductive blades, shield means shown generally at 108 are provided.

In an example embodiment, the shield means 108 are mounted around at least a portion of each rotor 102A and 102B to protect the upstream-moving blades from head-on wind airflow. As can be seen more clearly in FIG. 1B, the shield means are mounted around each rotor to protect the entire wind facing surfaces of the upstream-moving blades 104 from head-on wind airflow. In FIG. 1B, the innermost edge 113 of each shield means will be seen to generally align with the vertical axis of rotation 112 of each rotor so that no portion of the upstream-moving blades of either rotor is visible or presents a drag face to the wind. Any drag forces that would otherwise impact on the upstream or "dead" rotor blades 104 are therefore minimized As will be seen in FIG. 1A, each shield means 108 is airfoil shaped. The oncoming wind rushing around the outside of each airfoil shield, shown by arrows B, causes a region of relatively low pressure to form along the outer section of the shield means 108. The region of relatively low pressure is formed in a manner similar to the upper surface of an aircraft wing which lifts an aircraft in flight.

Venting means in the form of slots or gills 114 are formed in the body of each shield means 108. The slots 114 allow relatively higher pressure air located in an inner region 116 of each rotor (located adjacent the upstream-moving blades) to be sucked out or vented. The formation of a partial vacuum, or at least reduced air pressure, in this inner region 116 of each turbine rotor reduces drag on the upstream-moving blades. The wind-generated airflow is thereby additionally harnessed to contribute to the turning force of each turbine rotor, instead of slowing the rotor down as would occur if the wind were left to impact in conventional fashion on each rotor.

In an example embodiment, a fin stabilizer means 118 is provided for continuously orienting the wind turbine system 100 in the direction of the head-on wind generated airflow. This optimizes airflow over the rotors 102A and 102B and airfoil shield means 108.

In another example embodiment, each shield means 108 is movable physically or rotationally relative to the axis of rotation 112 of its associated turbine rotor 102A or 102B to adjust the airflow around the rotor independently of the direction of the head-on wind. The airfoil shaped shield is movable independently of the turbine rotor and is constructed so that it deflects wind from one side of the rotor and enhances the flow of air over the other side of the rotor. The orientation of the airfoil shield relative to the oncoming wind could be changed by use of a motor (not shown) or stabilizing fin 118 of the type described above. Either way could be used to determine the best "angle of attack" to maximize wind energy conversion.

Figure 2A:
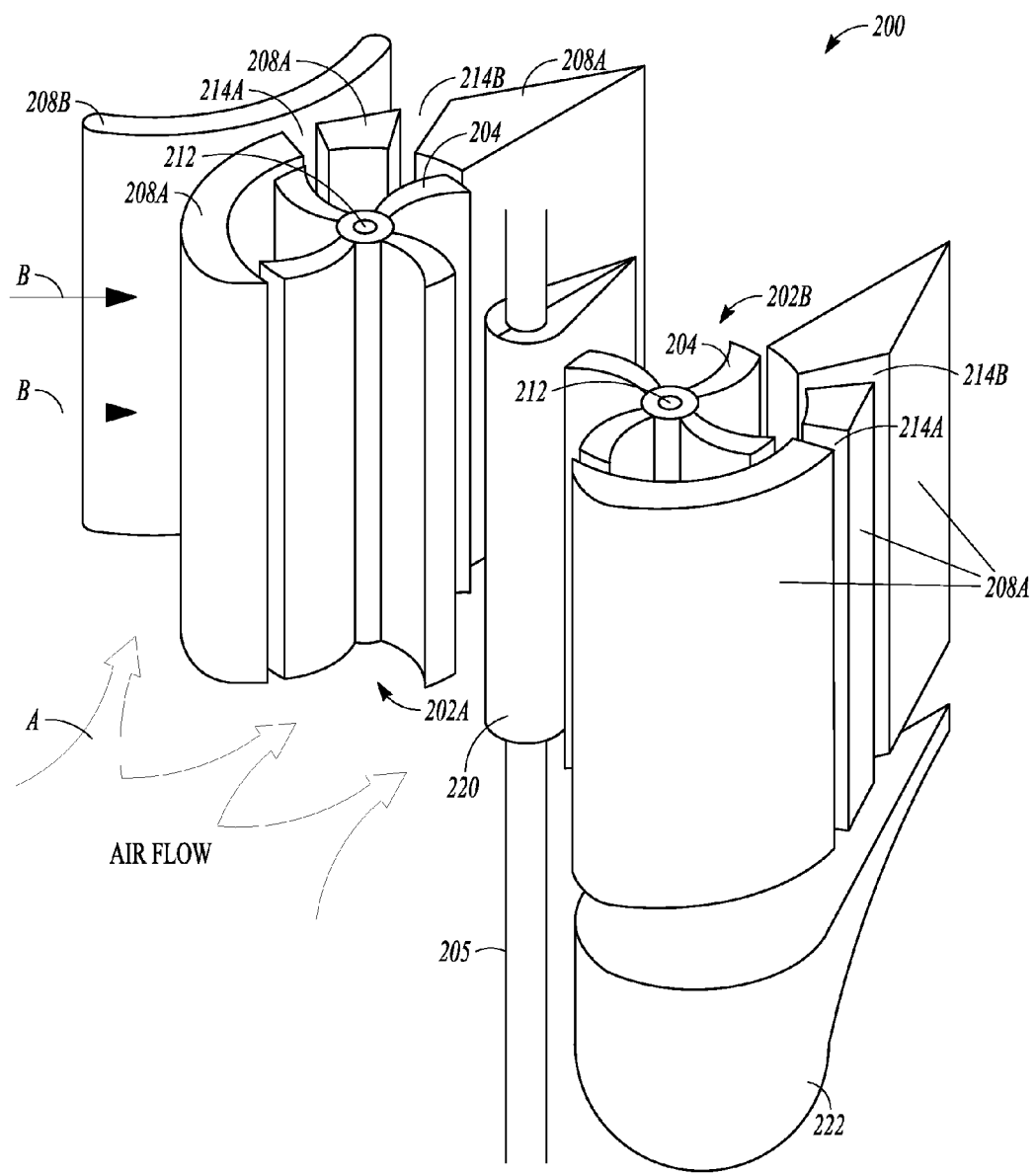
FIG. 2A shows a part sectional pictorial view of a wind turbine system, according to an example embodiment.

Reference is now made to FIG. 2A which shows, in part sectional view, the components of a wind turbine system 200 in accordance with an example embodiment. Similar numerals are used to refer to similar parts. In this view, two turbine rotors 202A and 202B are shown rotatably mounted in a support structure (not shown) to a utility pole 205. Each rotor 202A and 202B has blades 204 and a vertical axis of rotation 212. In this example embodiment, additional features are provided to enhance airflow over the wind turbine system 200 and assist energy conversion.

In this embodiment, airfoil shaped shield means 208A are again provided but in this case two venting slots or gills 214A and 214B are provided in the body of each shield means 208A. Each shield means 208A again defines a main airfoil for the wind turbine system but in this case a supplementary airfoil 208B is disposed adjacent the main airfoil to augment and channel airflow over the outer surface of the main airfoil 208A. In the interest of clarity, only one supplementary airfoil is shown in FIG. 2A, but another supplementary airfoil will typically be associated with rotor 202B and its associated main airfoil shield means 208A. This arrangement is visible in FIG. 2B. The supplementary airfoils increase the wind speed of the airflow passing over the main airfoil and enhance the suction on the rotor blades 204 as described above.

It will be appreciated that the two turbine rotors rotate in a direction counter to each other and there is potential for wind turbulence. With a view to addressing such turbulence, an airflow enhancer 220 is provided between the two rotors. The airflow enhancer 220 reduces the total channel width between the opposed rotors and speeds up the passing air by dint of it having to pass through a narrower channel The aerodynamic shape of the enhancer 220 minimizes turbulence and assists in providing a smooth and even impact of air onto the downstream-moving blades 204 of each turbine rotor 202A and 202B as they rotate.

In order to further assist in minimizing turbulence and creating smooth airflows, an aerodynamically shaped cowl 222 is provided beneath each rotor for housing an associated generator (not shown in FIG. 2A) of the type described above with reference to FIGS. 1A-1C.

In an example embodiment, means such as a bearing assembly (not shown in FIG. 2A, but visible in FIG. 2C) for mounting the rotor support structure rotatably to a base or support are also enclosed within the airflow enhancer 220 in order to minimize drag and augment smooth airflows.

Figure 2B:
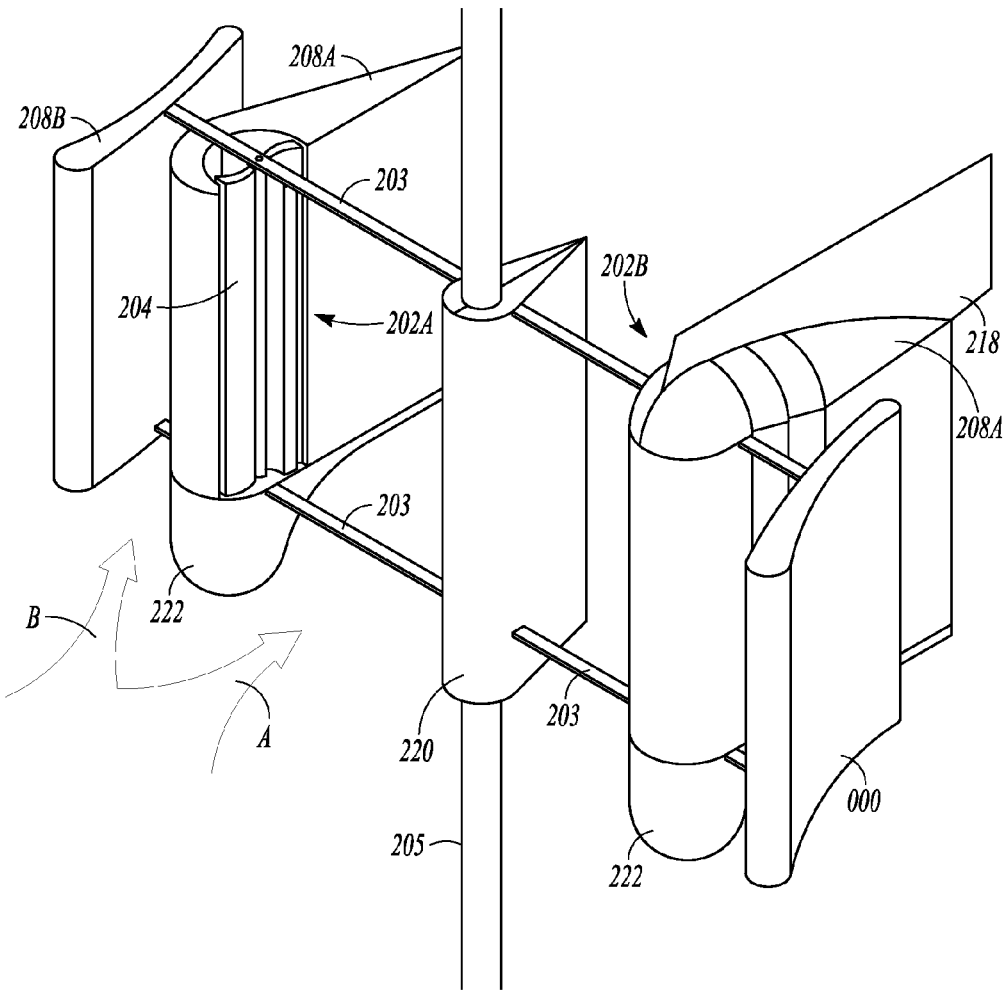
FIG. 2B shows a part sectional pictorial view of the wind turbine system shown in FIG. 2A, with some extra components of the system visible.

FIG. 2B shows a view similar to FIG. 2A, but with the rotor support structure 203 shown. Also visible are both supplementary airfoil shields 208B provided for both rotors 202A and 202B, as described above. A stabilizing directional fin 218 is provided on top of each rotor assembly (not visible above rotor 202A).

Figure 2C:
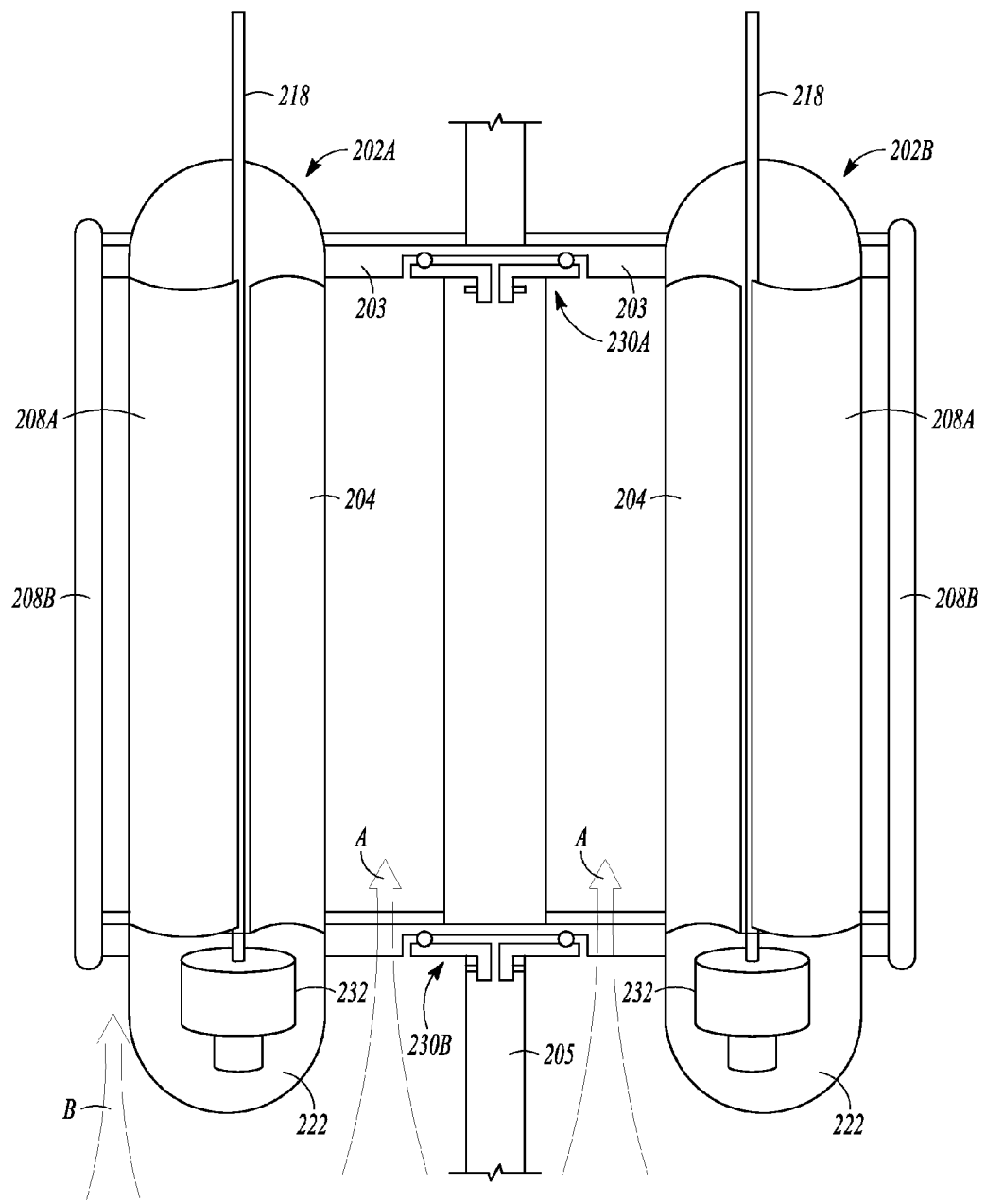
FIG. 2C shows a part sectional, front side view of a wind turbine system, according to an example embodiment.

FIG. 2C shows a view of an example embodiment of a wind turbine system similar to the systems depicted in FIGS. 2A-2B with similar numerals depicting similar parts. Additional sectional detail of bearing assemblies 230A and 230B is provided. The bearing assemblies are ideally housed within the airflow enhancer 220 described above. Power generators 232 are also visible in part sectional view of the cowls 222.

Figure 3:
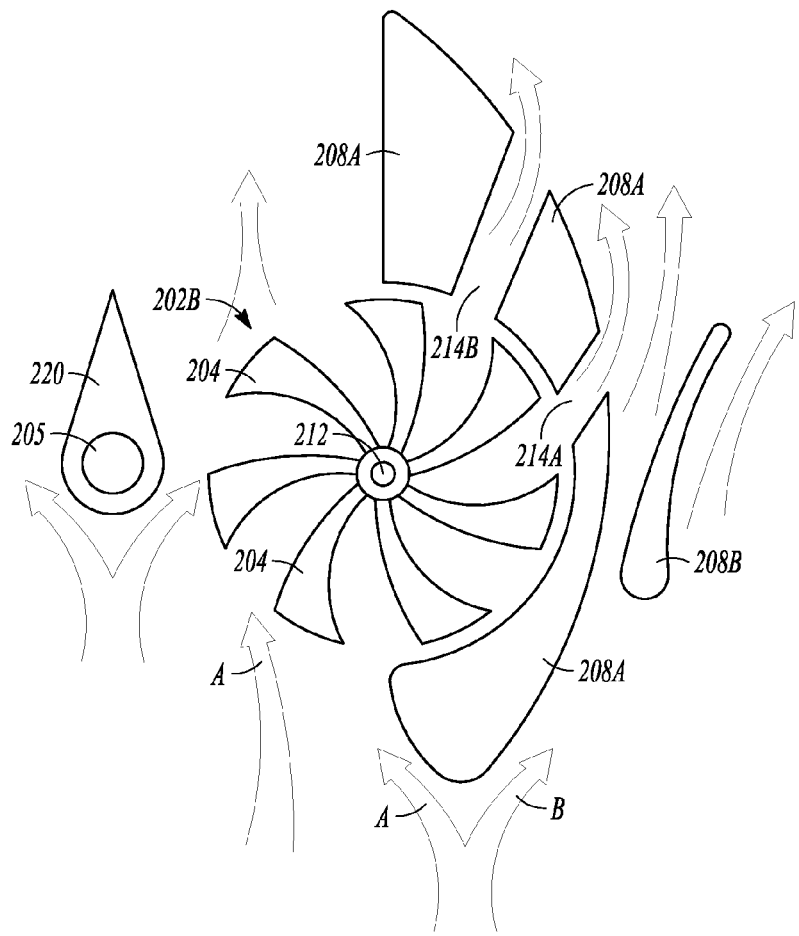
FIG. 3 shows a sectional top view of a wind turbine system according to an example embodiment, with wind direction arrows indicated as shown.

FIG. 3 shows a more detailed view of the typical airflows around the various components of a wind turbine system 200 of the type depicted in FIG. 2A. The suction forces exerted on the return blades 204 located adjacent the inner surfaces of the main airfoil shield 208A are believed to be enhanced by a venturi effect created by the diverging nozzle shape of the exit airflow channel created between airfoil shields 208A and 208B, as shown by arrows C in FIG. 3. The precise shape and position of the various slots 214 and nozzle shapes illustrated in the accompanying drawings, as well as the number and shape of illustrated rotor blades, can be varied to provide different power output and energy conversion ratings for the wind turbine system.

Figure 4A:
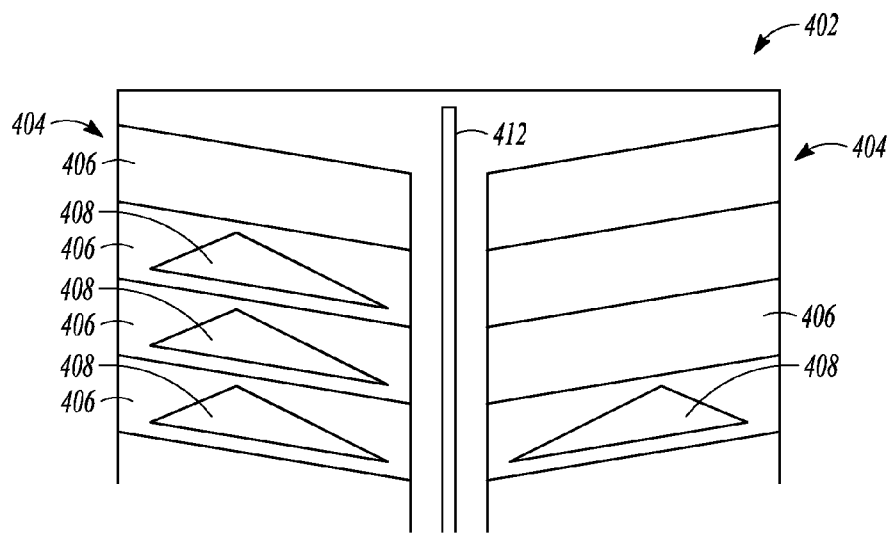
FIG. 4A shows a sectional view of a rotor of a wind turbine system, according to an example embodiment.
Figure 4B:
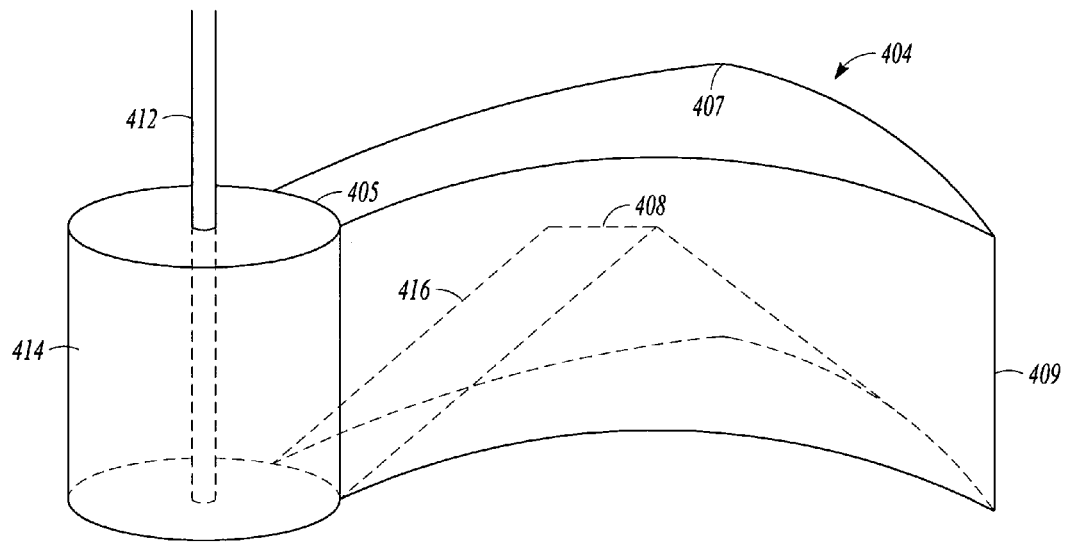
FIG. 4B shows a part sectional, pictorial view of load compensation cell for a rotor blade of the wind turbine system, according to an example embodiment.
Figure 4C:
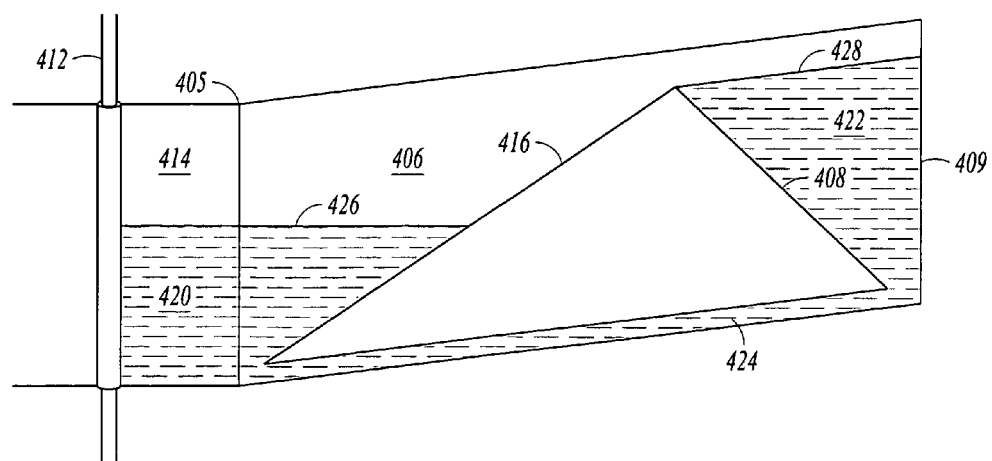
FIG. 4C shows a sectional view of the cell illustrated in FIG. 4B, with oil levels visible.

Reference is now made to FIGS. 4A-4C. These views depict how load compensation means can be provided in an example embodiment of a wind turbine system. The load compensation means are designed to decrease the moment of inertia of a turbine rotor when the wind-generated airflows impacting it are low so that the turbine rotor maintains rotational speed (or angular velocity), yet increase the moment of inertia at high airflow speeds so that sustained torque and energy conversion can be maintained by the rotor without excessive rotational speed, vibration and associated energy loss through its attached components.

In FIG. 4A, shown in schematic sectional view are diametrically opposed blades 404 disposed on either side of the axis of rotation 412 of a turbine rotor 402. Each blade 404 is hollow and comprises a series of cells 406. Each cell 406 defines an enclosed volume for holding a fluid (not shown) that is displaceable in use through or over fluid baffle means 408 towards or away from the vertical axis 412 of the rotor as the rotational velocity of the rotor changes under the influence of the wind generated airflow, or as the load the wind turbine is seeking to drive changes.

As shown more clearly in FIG. 4B, the proximate or inner end 405 of each rotor blade 404 positioned nearest the axis of rotation 412 is attached to a hollow spindle 414. The sectional area of each rotor blade 404 (when viewed from the axis 412 in a radial direction outward) increases from the proximate end 405 to a region of maximum chord 407, and then decreases again to the distal or outer end 409 of the blade to define in a plan view the curved nature of the blade which is visible when looking down on the blade along the axis of rotation 412.

The fluid baffle means 408 are hollow and of a wedge shape. As shown in FIG. 4C, displaceable fluid (for example, oil) held inside a cell 406 can travel up the incline 416 of the wedge shaped baffle 408 in periods of high rotational velocity, under the influence of the increased centripetal forces, to drain an inner region or reservoir 420 of the cell 406 and hollow spindle 414, and fill an outer region or reservoir of the cell 422. During periods of low angular velocity, the oil can return to the inner region 420 via a downwardly sloping channel or tube 424 located underneath the baffle 408.

The oil level during periods of rest or relatively low angular velocity is shown by numeral 426, while the oil level in region 422 in periods of relatively high angular velocity is shown by numeral 428. If a high angular velocity is maintained, the centripetal forces exerted by the rotating blades 404 of the turbine rotor 402 will serve to maintain the oil level at 428 accordingly. As the rotational speed of the rotor 402 changes, so too do the centripetal forces exerted on the oil and it is thereby caused to displace automatically over or under the baffle means to continuously adjust the moment of inertia of the turbine rotor and provide load compensation for the wind turbine system.

The inclined nature of the fluid baffle 408 allows the oil to gain potential energy (due to height gain) and invokes an additional gravitational resistance to the displaced oil and provides a wider band of load compensation. The outwardly displaced fluid stores energy which can be returned to the rotor when it slows down so that rotational speed is preserved. A variable flywheel effect is thus provided to smooth the rotation of the turbine rotor 402.

Various shapes of fluid baffle, rotor blade and airfoil shield can be provided or tested in a wind tunnel or variety of conditions to optimize performance and energy conversion. In one example embodiment of a fluid baffle 408, the interior angles of the wedge shape are 107, 50, and 23 degrees respectively, with the sharpest corner (23 degrees) located towards the inner end 405 of the turbine blade 404 in which it is contained.

Figure 5:
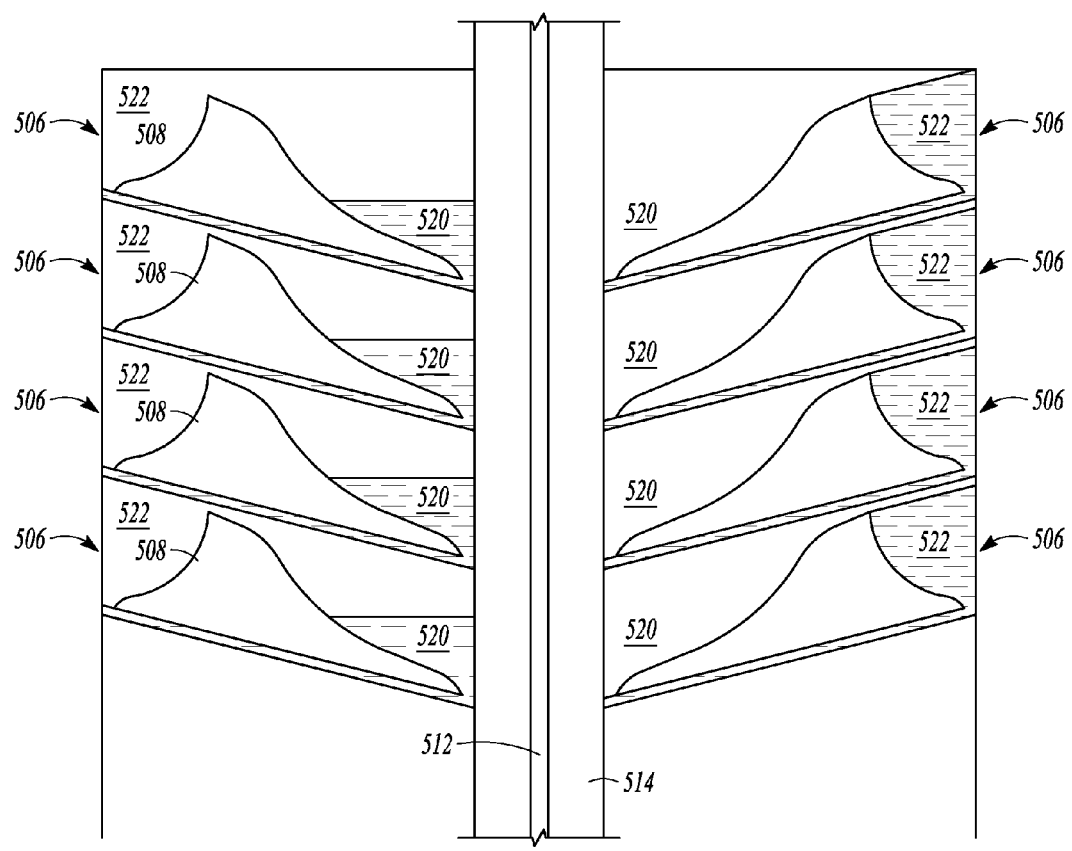
FIG. 5 shows a sectional view of rotor blades for a rotor of a wind turbine system, according to an example embodiment.

FIG. 5 shows a view of a wind turbine system similar to FIG. 4A, but in this case the wedge-shaped baffles 508 in each cell 506 are arcuate in outline along each side. The cells 506 shown on either side of the axis of rotation 512 are displayed in two different instances. In the cells 506 in the left side of the view, the oil resides in the inner reservoir 520 of each cell. In this instance, the rotor blades containing the oil are rotating more slowly around the axis of rotation 512. In the cells 506 in the right side of the view, the oil resides in the outer reservoir 522 of each cell. In this instance, the rotor blades containing the oil are rotating more quickly around the axis of rotation 512 and the oil has gained energy to be returned when the rotor slows down.

Figure 6:
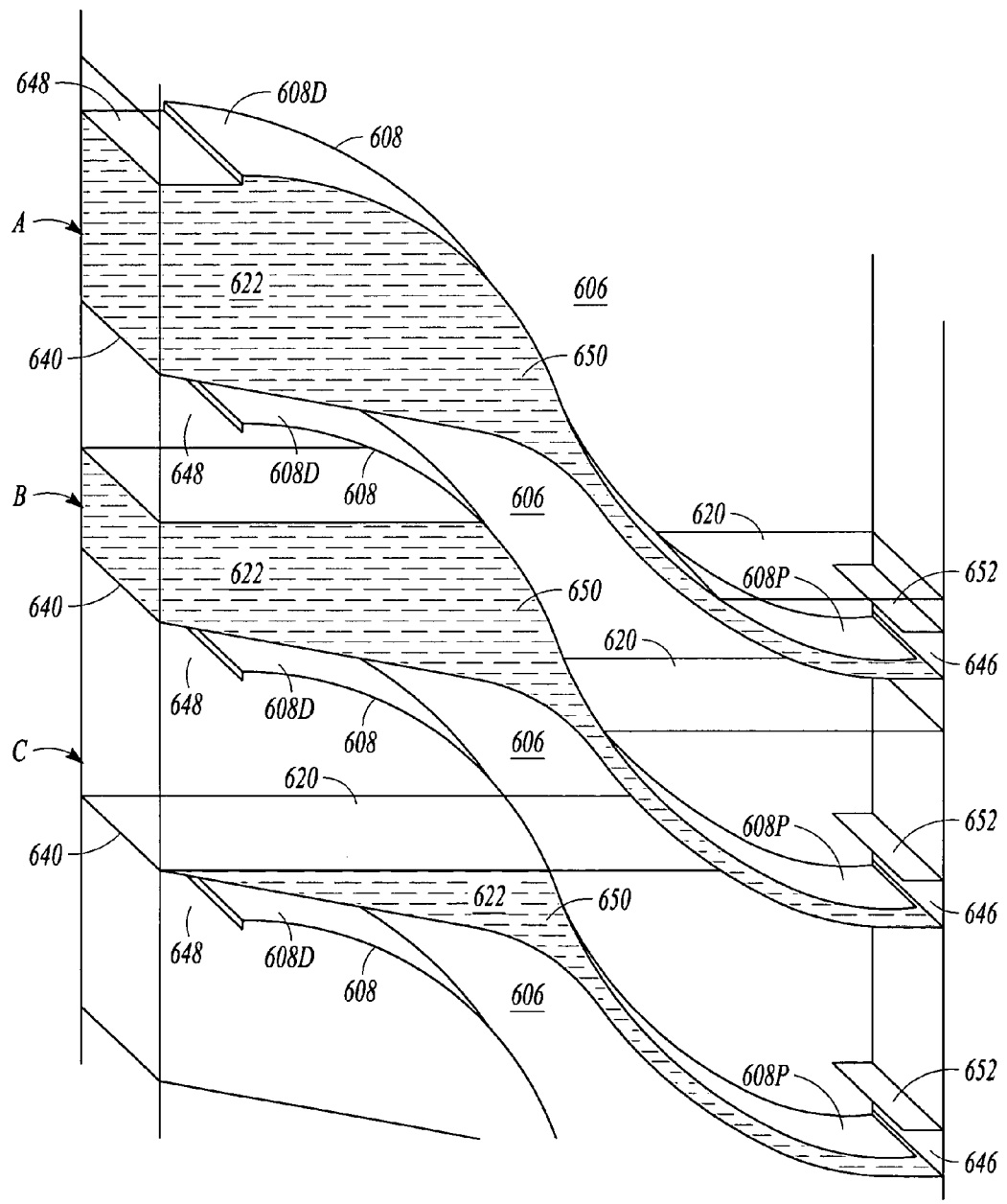
FIG. 6 shows a sectional view of a rotor blade for a rotor of a wind turbine system, according to an example embodiment.

FIG. 6 shows a sectional view of a rotor for a further embodiment of a wind turbine system having load compensation means. In this example embodiment, each cell 606 in the turbine blade 604 is separated from another adjacent cell by a compartment wall 640. A series of compartment walls 640 define the upper and lower walls (or floors and ceilings, as it were) of adjacent cells in the illustrated stack of cells. A fluid baffle 608 provided in each cell 606 assumes a generally sinusoidal or undulating strip or plate form as shown in the drawing. The side edges of the compartment walls 640 are fixed to the side walls of each respective cell to define enclosed volumes for holding displaceable fluid (such as oil) in the manner shown. The side edges of the fluid baffles 608 are also fixed to the cell side walls, but at the proximal (or inner) ends 608P and distal (or outer) ends 608D of the baffles, fluid passage gaps 646 and 648 are respectively provided. The fluid passage gaps 646 and 648 are respectively formed adjacent the radially inner and outer walls of each cell 606. The passage gaps allow fluid to pass between upper and lower regions above or below each baffle 608.

The compact nature of each baffle and the minimalist structure of each cell allow the provision of many cells in a given turbine blade to improve the load compensation performance of the turbine rotor as a whole. Three cell levels, shown at arrows A, B and C, are depicted in the cell stack of the turbine blade illustrated in FIG. 6. Level A represents a situation of high rotational velocity of the rotor blade in which oil, under influence of centripetal force, has climbed the incline of the sinusoidal baffle plate 608 to spill over the lip of fluid passage gap 648 and fill an outer reservoir region 622 of the cell 606. The oil may also seek to flow outwardly to fill the outer reservoir 622 through a return fluid channel or tube 650 formed underneath each baffle plate 608, but this type of outward flow is minimized by flow hinder flaps 652 positioned adjacent inner fluid passage gaps 646. In this Level A situation, the oil has been emptied from an inner reservoir region of the cell region as shown by the depleted oil level 620.

Level B represents a situation of medium rotational velocity of the rotor blade in which the outer reservoir region 622 of the blade is about half-full and the oil level in the inner region is moderate, as shown by oil level 620. In this situation, the oil is no longer under the same degree of centripetal force as level A and has been allowed to fall down the baffle plate and give back stored energy to the rotor turbine it is located in. Level C represents a situation of rest or low wind speed. At times of zero or low rotational velocity the outer reservoir 622 is substantially depleted and the oil level 620 in the inner reservoir region is relatively high.

Figure 7:
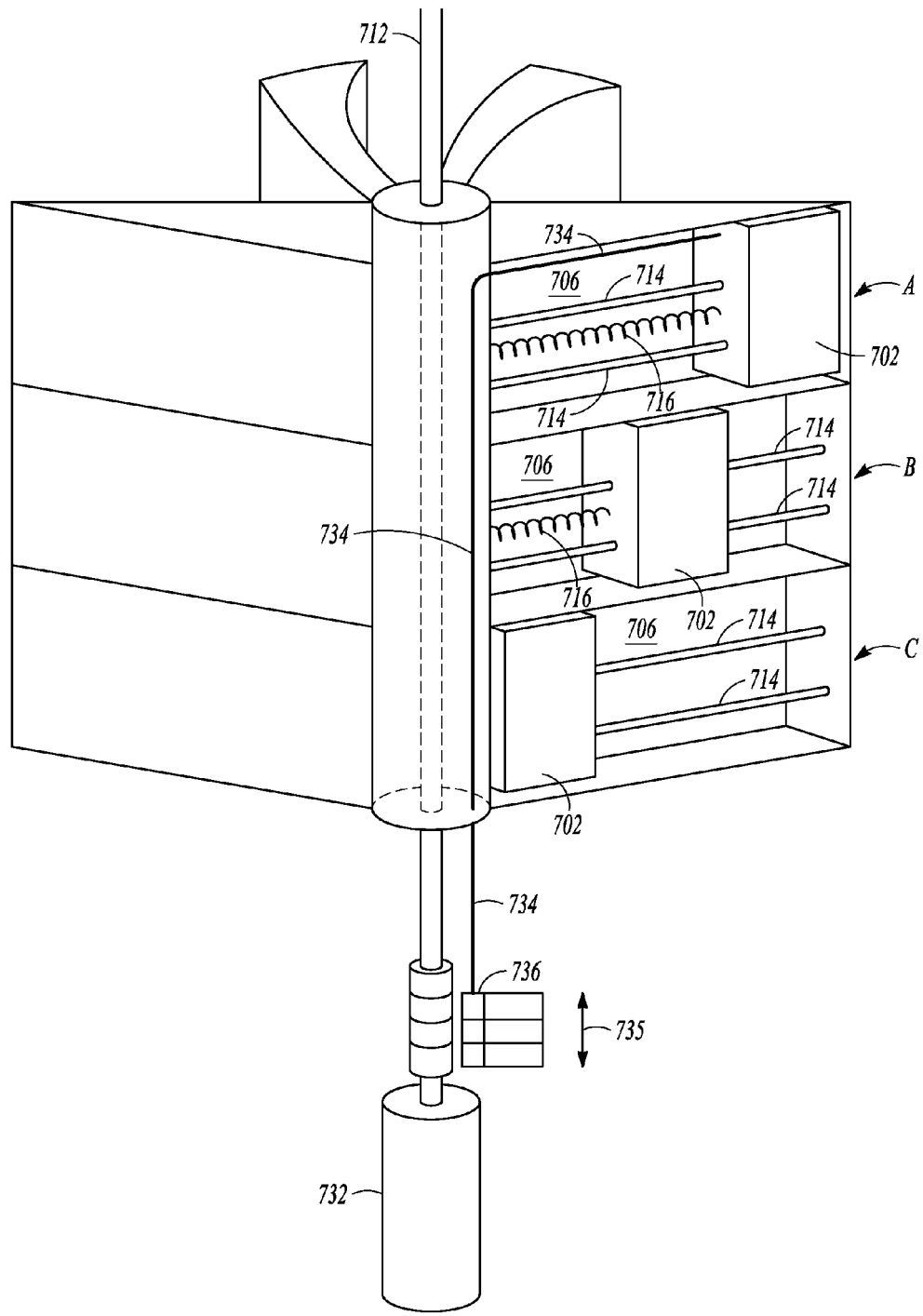
FIG. 7 shows a part sectional view of a rotor blade for a rotor of a wind turbine system, according to an example embodiment.

Reference is now made to FIG. 7 which shows a further example embodiment of a wind turbine system having load compensation means. In this example embodiment, solid weights 702 are provided in cells 706. The weights 702 can move inwardly or outwardly in a radial direction relative to the rotor's axis of rotation 712 along slider rods 714. Energy return means in the form of springs 716 store energy and provide a balancing restorative force to the weights 702 as they slide outward when the rotational velocity of the rotor blade increases. As the rotational speed of the blade decreases, the springs pull the weights inward and return energy to the rotor to help it preserve rotational speed. As in FIG. 6, cell levels A, B, and C are shown with each level representing a different rotational speed condition, with level A the fastest speed and level C the slowest.

A connection means in the form of a cable 734 extends over pulleys (not shown) between the slidable weights 702 and the commutator brushes 736 of a power generator 732 disposed beneath the rotors of the wind turbine. The brushes can be moved up or down in direction of arrow 735 by the cable 534 depending on the radial position of the weight in cell level A which in turn depends on the rotational speed or turbine load conditions. The cable moves the brushes to engage, for example, more windings of the generator in conditions of high wind-generated airflow. Equally, in conditions of low airflow, some generator windings can be disengaged to reduce load and maintain rotor rotation at a steady speed. Manually selective or automatic engagement or disengagement of the generator also serves to act as a load compensation means for the disclosed wind turbine system.

In various embodiments of the wind turbine system described and illustrated herein, the turbine blades could be straight or planar, relatively thick or thin in sectional thickness, and with or without a leading or trailing edge. It is envisaged that for load compensation means of the type described and illustrated in FIG. 7 in which, for example, solid weights move in a linear radial direction, planar turbine blades will work best. Other load compensation embodiments using a liquid allow the use of curved turbine blades.

Figure 8:
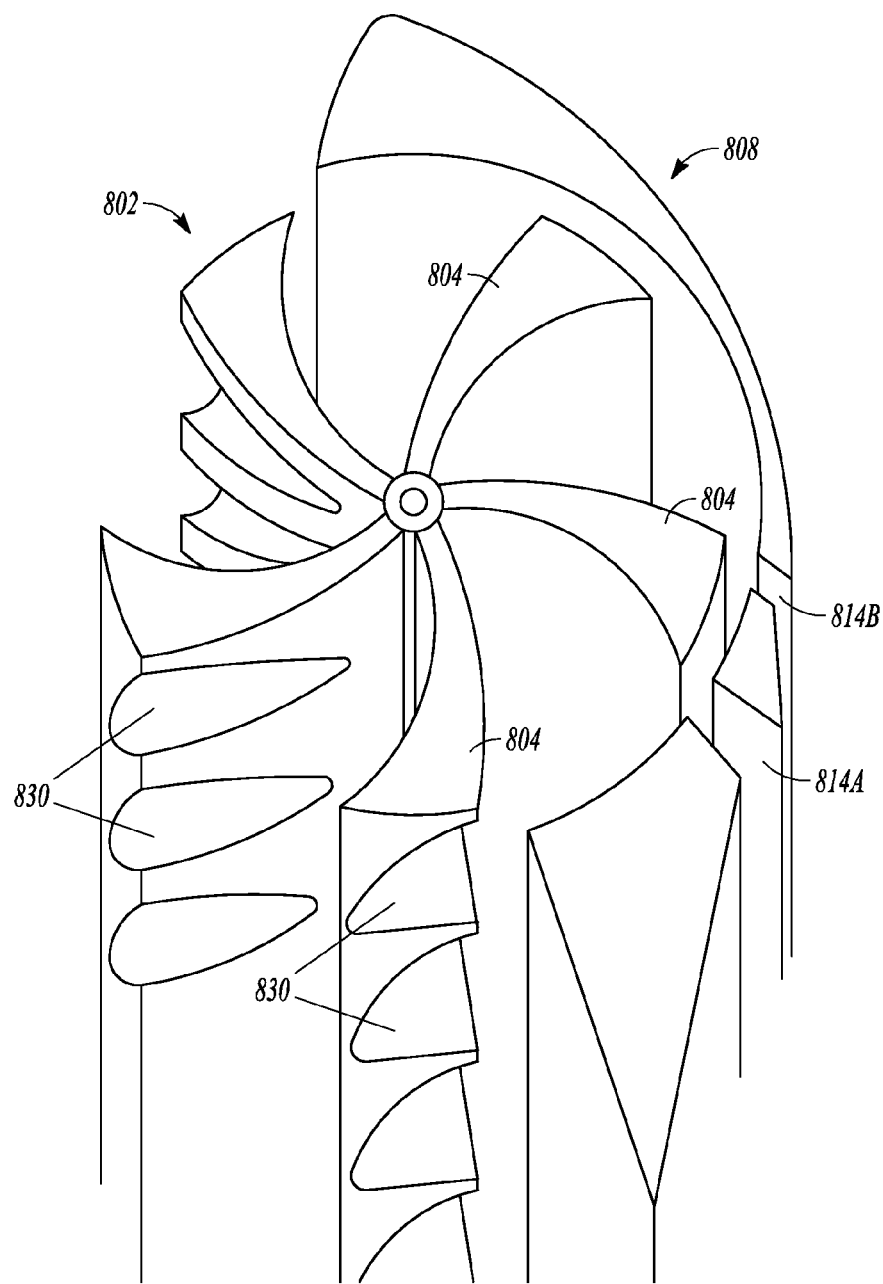
FIG. 8 shows a pictorial view of a rotor and airfoil shield means for a wind turbine system, according to example embodiments.

FIG. 8 shows an example embodiment of a turbine rotor 802 having blades 804 in which notched, chamfered, or beveled trailing edges 830 are provided. The shaped trailing edges serve to facilitate reduction of air pressure and outlet of air through the vents (or gills) 814A and 814B of the airfoil shield means 808 and increase efficiency and wind energy conversion.

FIGS. 9A-9C depict example load compensation means in the form of a governor system that can be used in conjunction with the disclosed wind turbine system. FIG. 9A depicts operation of the governor in under-speed or low air speed conditions. FIG. 9B illustrates the governor in medium or steady wind speed conditions, while FIG. 9C depicts the governor in over-speed or fast airflow conditions.

From a fixed support at 901, rotating governor weights 903 of the governor system depicted in FIGS. 9A-9C operate as they rotate at varying speeds to raise or lower commutator brushes shown in schematic outline at 902 to engage or release windings in a power generator driven by the wind turbine system in a manner similar to the cable 734 described above. Winding terminal connections are shown in schematic outline at 904. At rest or low wind speeds as shown in FIG. 9A, no windings are engaged. At moderate wind speeds or steady operating conditions, a few windings are engaged as shown in FIG. 9B, while in FIG. 9C, all the generator windings are engaged at full speed.

Figure 10A:
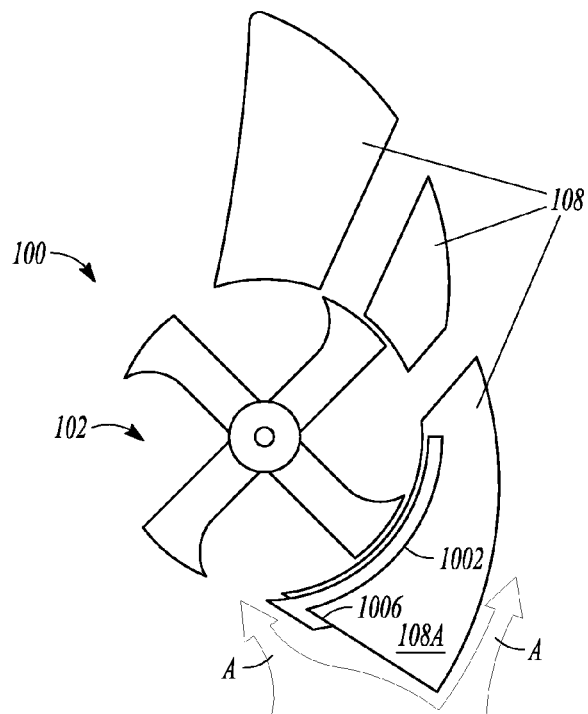
FIGS. 10A and 10B show sectional views of a wind turbine system, according to example embodiments.
Figure 10B:
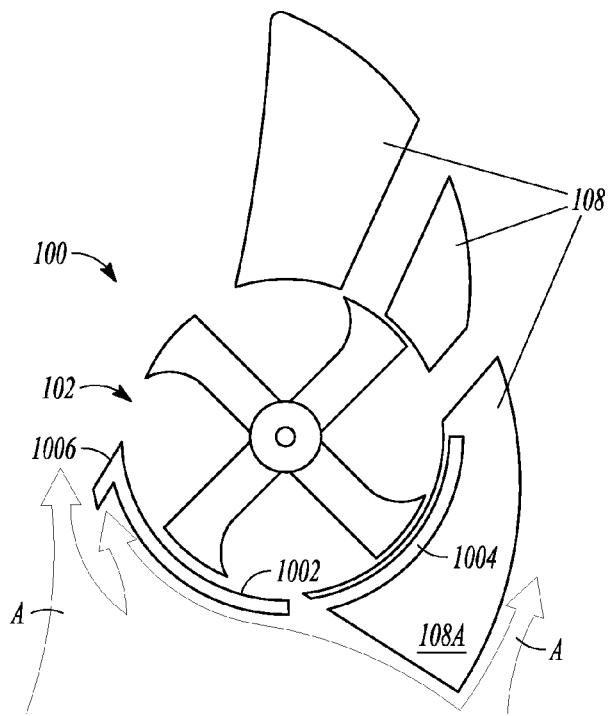

Reference is now made to FIGS. 10A and 10B of the accompanying drawings. These views depict an example embodiment of the wind turbine system in which the shield means 108 has an extension or storm shield 1002 which can be extended in high wind speed or storm conditions, as shown in FIG. 10B, to protect the rotor 102 from excessive rotational velocities and potential damage from flying storm debris. In the illustrated example, the extension shield 1002 is curved to wrap closely around the rotor 102 when extended and is held in a complementarily shaped housing 1004 formed in a leading section 108A of the wind shield means 108. The extension shield 1002 extends automatically out of its housing in section 108A at high wind speeds and in an example embodiment retracts back into the housing automatically as the wind speed drops. The shield is retracted under action of a retraction spring (not shown). At the leading edge of the extension shield 1002, a wind-engaging formation in the form of a lip 1006 is provided. The lip 1006 catches the passing wind, shown generally by arrows A, and at high wind speeds the wind engagement of the lip 1006 generates sufficient extraction force to urge the extension shield 1002 out of the housing 1004 into protective operation. In the example embodiment, the degree of extraction of the extension shield is proportional to the velocity of the passing wind A. In storm conditions, the extension shield 1002 can be fully extended to completely surround the upwind sections of the rotor 102 as shown in FIG. 10B.

Figure 11:
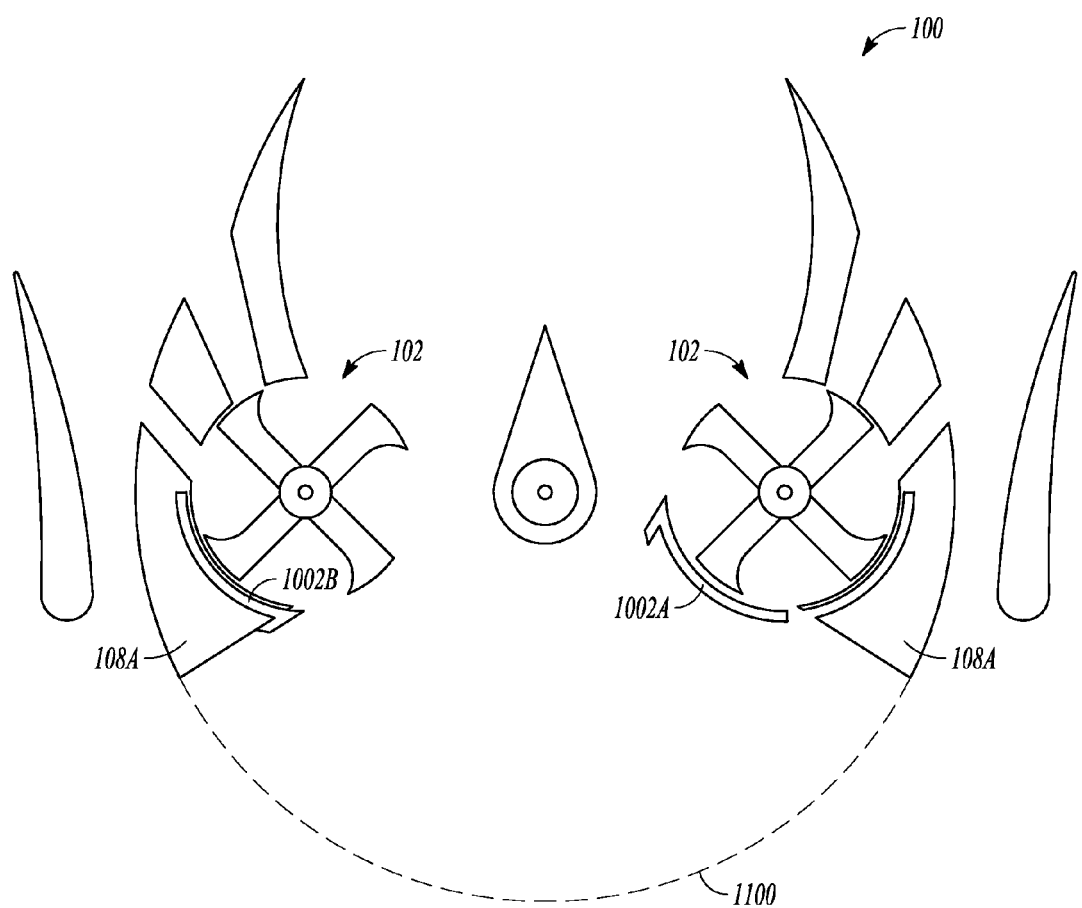
FIG. 11 shows a sectional view of a wind turbine system, according to an example embodiment.

Reference is now made to FIG. 11 of the accompanying drawings which shows a further example embodiment of wind turbine system in schematic outline in plan sectional view. The extension shields 1002 mentioned just above are shown simply for illustrative purposes in extended and retracted positions at 1002A and 1002B respectively. In normal operating conditions, the extension shields will generally tend to extend and retract together.

At an upwind location of the wind turbine system, a bird cage attachment is provided. The bird cage can be seen in dotted outline at 1100. The cage is attached at each end to leading sections 108A of the wind shield means 108. Other means of attachment are possible. In the illustrated view, the bird cage 1100 assumes a circular outline when viewed from above. In some embodiments, the overall outline of the wind turbine system including the wind shield means and bird cage is generally circular in plan view. As shown, the upwind, leading edges or faces of the opposed wind shield means 108A are inclined at an angle of approximately 90 degrees to each other to assist in directing as much wind flow as possible onto the rotors 102. The bird cage included in the turbine system and mounted adjacent the rotors protects the rotors and prevents flying birds from being sucked into or harmed by the rotor blades as the rotors 102 rotate in use. In an example embodiment, the cage comprises a mesh material in which the mesh filaments are very fine so any obstacle to the oncoming wind is minimized and the force of the wind acting on the rotor blades is not unduly impacted.

Figure 12:
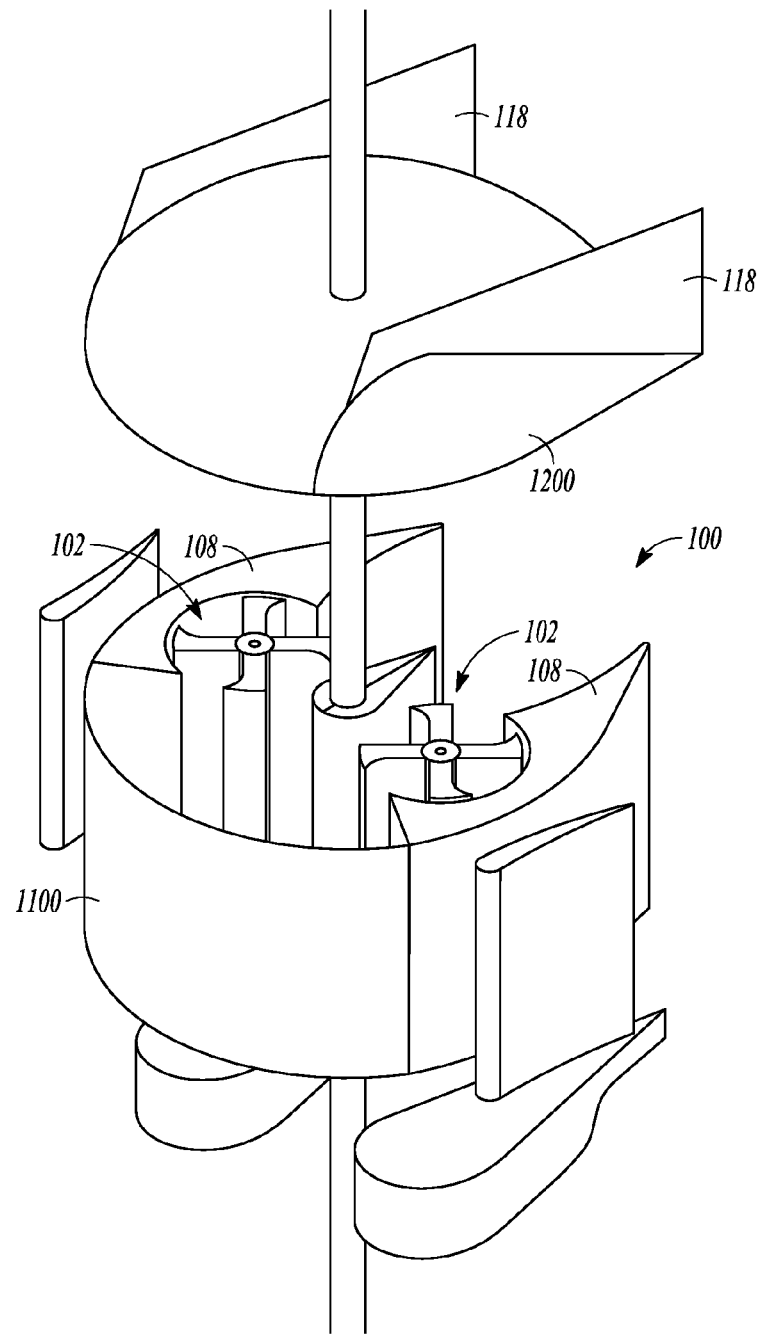
FIG. 12 shows a pictorial view of a wind turbine system, according to an example embodiment.

The bird cage 1100 can be seen more clearly in pictorial view in FIG. 12 of the accompanying drawings. In this example embodiment of a wind turbine system 100, a protective roof cowl 1200 is provided which is mounted over the rotors 102 to protect them from snow, rain and ice. The roof cowl 1200 is shown in an elevated position for clarity, but will normally sit directly on top of and be attached to an appropriate section of the wind shield means 108. In an example embodiment, the roof cowl 1200 carries stabilizing fins 118 of the type described further above.

Several clusters or pods of the illustrated wind turbine systems can be provided in suitable locations without having to reconfigure structures, for example on pre-existing utility poles, electricity pylons or telephone poles, for example. The illustrated systems can be installed in locations in which space is limited, or for example places where the wind is more plentiful such as the top, sides, or especially corners of buildings. The illustrated wind turbine systems can accommodate many wind directions and gusting conditions. The aesthetics of the illustrated systems are pleasing and unlike large airscrew turbines do not detract from the natural beauty of rural country sides, hill tops and so forth. There are no large moving blades and birds and wild life are accordingly kept safer in their natural environments. Economic units of the illustrated systems can be provided in small, compact sizes and sound reduction due to the partially enclosed blades is enhanced.

Although the invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A vertical axis wind turbine system that converts wind energy into electrical or mechanical energy comprising:
   a turbine rotor with a plurality of blades for receiving head-on wind generated airflow, at least some of the blades moving in a downstream wind direction and some of the blades moving as return blades in an upwind direction as the turbine rotor rotates within a rotor chamber; wherein each blade is attached to a spindle at a vertical axis of rotation and radiates parallel to the spindle; and
   a rotor support structure mountable to a base or support for holding the turbine rotor in the head-on wind generated airflow; and
   a wind shield means mountable upwind of at least a portion of the turbine rotor to protect the return blades from the head-on wind generated airflow; wherein the wind shield means:
   (a) shields the turbine rotor from oncoming head-on wind generated airflow by means of an extension shield which slides from a slot contained in a leading edge of the wind shield means
   (b) comprises a plurality of longitudinal slots or gills through a section of the wind shield means connecting it to the rotor chamber for venting
   (c) the slots or gills comprise a beveled leading edge portion at a downstream side of each slot on a side opposite the rotor chamber.

2. The wind turbine system of claim 1, wherein the wind shield means are mountable around the turbine rotor to protect the upwind facing surfaces of the return blades from the head-on wind generated airflow.

3. The wind turbine system of claim 2, wherein the wind shield means are airfoil shaped to cause a region of low pressure to form along at least one outer section of the wind shield means.

4. The wind turbine system of claim 3, wherein the venting slots or gills allow an inner region of the rotor adjacent the return blades to vent to the region of low pressure in use.

5. The wind turbine system of claim 4, wherein the venting slots or gills are formed in a section of the wind shield means and are configured to exhaust the rotor chamber downstream of intakes in the rotor chamber.

6. The wind turbine system of claim 1, wherein the rotor support structure is mountable rotatably to a base or support and wherein the vertical axis wind turbine system further comprises a fin stabilizer means for continuously orienting the vertical axis wind turbine system into the head-on wind generated airflow.

7. The wind turbine system of claim 1 wherein the wind shield means are movable relative to the vertical axis of rotation of the turbine rotor to adjust the head-on wind generated airflow around the turbine rotor independently of the head-on wind generated airflow.

8. The wind turbine system of claim 3, wherein the wind shield means comprise a main airfoil and a supplementary airfoil disposed adjacent the main airfoil to augment airflow over the main airfoil.

9. The wind turbine system of claim 1, further comprising at least a second turbine rotor mounted to rotate in a counter-direction to the turbine rotor in the rotor support structure, so that the two turbine rotors are generally parallel to each other in the rotor support structure.

10. The wind turbine system of claim 9, wherein an airflow enhancer is provided between the at least two turbine rotors.

11. The wind turbine system of claim 10, wherein means for mounting the rotor support structure rotatably to a base or support are enclosed within the airflow enhancer.

12. The wind turbine system of claim 1, further comprising a load compensation means to adjust a moment of inertia of the turbine rotor.

13. The wind turbine system of claim 12, wherein the load compensation means are provided within the blades of the turbine rotor the at least one turbine rotor.

14. The wind turbine system of claim 13, wherein one or more of the blades of the at least one turbine rotor are hollow and define a closed volume for holding a fluid, the fluid being displaceable towards or away from the vertical axis of rotation of the rotor as a rotational velocity of the rotor changes.

15. The wind turbine system of claim 14, wherein the one or more hollow blades of the turbine rotor comprises a fluid baffle means through or over which the fluid can pass as it is displaced towards or away from the vertical axis of rotation of the turbine rotor as the rotational velocity of the turbine rotor changes.

16. The wind turbine system of claim 15, wherein the one or more blades of the at least one turbine rotor comprises a plurality of vertically stacked cells, each cell set at an angle with respect to a horizontal plane extending perpendicular to the vertical axis of rotation and defining a closed volume for holding the fluid.

17. The wind turbine system of claim 16, wherein each cell comprises a fluid baffle means through or over which the fluid can pass as it is displaced towards or away from the vertical axis of rotation of the turbine rotor as the rotational velocity of the turbine rotor changes.

18. The wind turbine system of claim 1, wherein the extension shield further comprises a protruding lip on a leading edge of the extension shield and is retracted by a spring within the wind shield means.

19. The wind turbine system of claim 17, wherein one or more cells:
 (a) comprises a return tube formed underneath each baffle for the return of the fluid towards the axis of rotation of the turbine rotor as the velocity changes
 (b) is divided to form and separate an inner reservoir near the vertical axis of rotation of the turbine rotor from a higher reservoir at an outer end of the blade; and
 (c) comprises the baffle being of various shapes including wedge, triangle or sinusoidal shapes.

* * * * *